United States Patent [19]
Givens

[11] Patent Number: 4,467,642
[45] Date of Patent: Aug. 28, 1984

[54] METHOD FOR IDENTIFYING COMPLEX LITHOLOGIES IN A SUBSURFACE FORMATION

[75] Inventor: Wyatt W. Givens, Dallas, Tex.

[73] Assignee: Mobil Oil Corporation, New York, N.Y.

[21] Appl. No.: 478,822

[22] Filed: Mar. 25, 1983

[51] Int. Cl.³ .................. E21B 49/00; G01V 5/10; G01V 3/08
[52] U.S. Cl. .................................. 73/152; 250/270; 324/362; 324/366
[58] Field of Search .................. 73/152; 250/270; 324/362, 366

[56] References Cited
U.S. PATENT DOCUMENTS
4,135,087  1/1979  Oliver et al. .................. 250/270

Primary Examiner—Howard A. Birmiel
Attorney, Agent, or Firm—A. J. McKillop; Michael G. Gilman; George W. Hager

[57] ABSTRACT

A method of logging a subsurface formation surrounding a borehole includes the recording of an induced polarization log, the recording of a nuclear log of delayed gamma-rays from the activation of aluminum in the formation, and the recording of a nuclear log of natural gamma-rays from potassium in the formation. The induced polarization log and the nuclear logs are combined to identify the composition of the lithology of the subsurface formation.

7 Claims, 3 Drawing Figures

METHOD FOR IDENTIFYING COMPLEX LITHOLOGIES IN A SUBSURFACE FORMATION

BACKGROUND OF THE INVENTION

In the search for hydrocarbons and in the evaluation of coal and synfuel type deposits, drilling represents an expensive commitment. A drilled hole can become worthless unless basic logs taken in such a hole can provide information vital to evaluating the potential of the surrounding area. If the lithology of the area is simple and known, analysis of the logs will give good values of the parameters needed to evaluate a reservoir and to determine reserves. However, the complex composition of mixed lithologies being encountered worldwide in oil and gas exploration and production have greatly complicated log analysis and current log analysis methods are not adequate in many areas. The need is for logs to specifically and quantitatively identify basic rock types (limestone, dolomite, sandstone, and mixtures of these), clay type and volume, and minerals that adversely affect the logs used to estimate reserves. The practice of cross plotting the basic porosity logs (sonic, density, and neutron) to identify lithology is at best semiquantitative even though used for quantitative corrections. This practice introduces error of unknown magnitude in the basic log-derived parameters of porosity, oil saturation and water saturation.

Large surface area clays are often associated with low resistivity (high water saturation) sands that produce almost water-free oil or gas. The basic logs correctly show these formations to have water saturations in the range of 60% to 90%. Clean sands that show this range of water saturation produce much water and little if any oil or gas. Water is bound to the clay surface and is not produced in one case but is freely produced in the other. The problem is that the basic logs don't show a unique difference between the two types of formations.

SUMMARY OF THE INVENTION

In accordance with the present invention there is provided a method for identifying complex lithologies in a subsurface formation surrounding a borehole. The combination of induced polarization, aluminum content and potassium content is used to identify select clay minerals from subsurface deposits. A stimulating electrical current flow is introduced into the subsurface formation to induce electrical polarization and the phase angle between the stimulating current and the resulting induced voltage is measured. Such phase angle is indirectly related to the surface area of the select clay mineral.

The subsurface formation is identified as to its aluminum content through the measure of delayed gamma-rays from the neutron activation of the formation. The potassium content of the subsurface formation is identified through the measurement of natural gamma-rays.

The combination of the in-situ measurements for induced polarization, aluminum content and potassium content are then correlated with the known combination of such measurements from core samples for said select clay minerals to identify the presence of any of such clay minerals in the complex lithology of the subsurface formation surrounding the borehole.

In a further aspect of the invention nuclear magnetic resonance measurements are made on core samples of select clay minerals to provide a direct measure of the surface area of the select clay minerals. Induced polarization measurements are also made on the core samples to provide a correlation between the extent of polarization induced in each of the select clay minerals and its directly measured surface area. The in-situ induced polarization measurement is then correlated with the induced polarization measurements on core samples as an indirect measure of the surface area of the select clay minerals present in the subsurface formation.

DESCRIPTION OF THE PREFERRED EMBODIMENT

The present invention is directed to a new logging method for identification of the composition of complex lithologies being encountered in oil and gas exploration and production, and more particularly to the identification of low resistivity sands associated with large surface area clays that produce mostly water-free oil and gas. Iron and iron minerals adversely affect neutron and density logs, basic logs for measuring porosity. Pyrite, a conductive iron mineral, can also affect electric logs causing them to indicate a higher than actual water saturation. Large surface area clays and pyrite produce a large induced polarization (IP) response. Clean sands, low surface area clays, and other iron minerals produce a much smaller IP response. The method of the present invention permits the identification of these various types of compositions through surface area measurements and nuclear logs to identify characteristic elements of clays, such as aluminum and potassium. Surface area of clay minerals can be measured directly through measurements such as nuclear magnetic resonance. However, in the well logging operation of the present invention the surface area of clay minerals in the formations surrounding the borehole are measured indirectly through induced polarization (IP) measurements.

Figure 1:
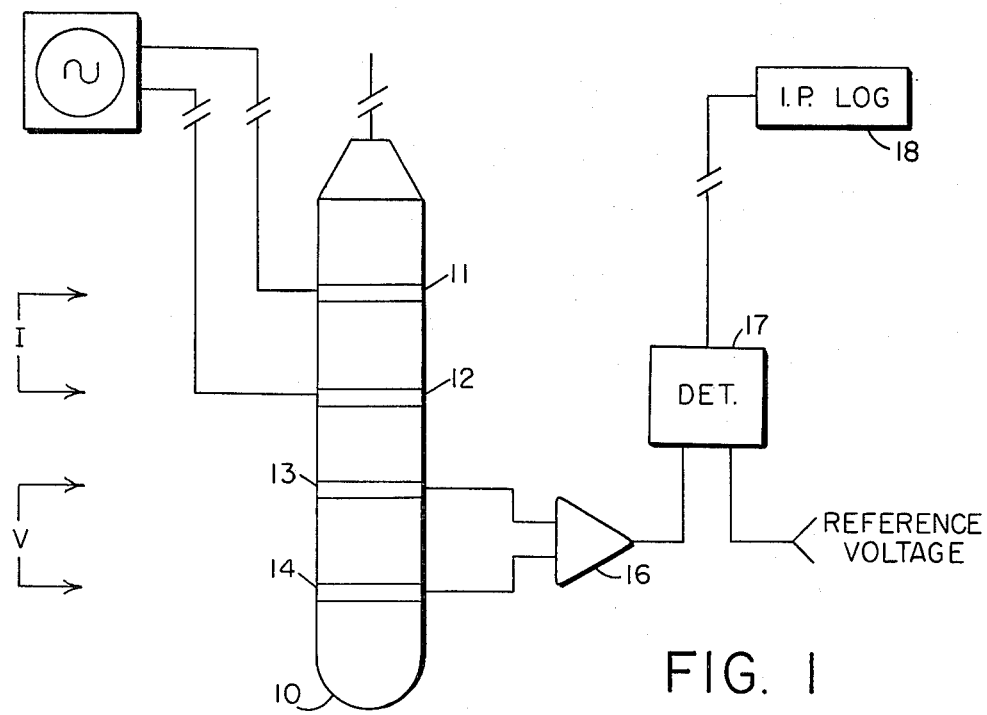
FIGS. 1 and 2 illustrate logging systems for recording an induced polarization log of formations surrounding a borehole.

A logging sonde for carrying out in-situ IP measurements is shown in FIG. 1. The logging sonde 10 employs a dipole-dipole array for carrying out induced polarization measurements. Basically, induced polarization logging is a method in which electrical current is induced in the formation surrounding the borehole through the pair of current electrodes 11 and 12 and the resulting out-of-phase voltage is measured across the pair of voltage electrodes 13 and 14. This voltage measurement represents the quadrature of the reactive and resistive components of the electrical impedance of the formation. A more complete description of the induced polarization phenomenon is set forth by S. H. Ward and D. C. Frazer in "Conduction of Electricity In Rocks," Mining Geophysics, 1967, v. 2, pgs. 198-223. A description of induced polarization as it relates to borehole logging, along with a detailed description of a logging sonde for carrying out such induced polarization measurements in-situ, is set forth in U.K. patent application No. 2,068,563, filed Jan. 23, 1981 and published Aug. 12, 1981, which patent application is incorporated herein by reference.

Briefly, however, an AC current source is coupled to the pair of electrodes 11 and 12. The voltage measured across the pair of electrodes 13 and 14 is applied to a differential amplifier 16. The signal from amplifier 16 is compared by the phase detector 17 with a reference voltage which is proportional to the AC current supplied to the pair of current electrodes 11 and 12. Phase detector 17 measures the in-phase $V_1$ and quadrature $V_2$ components and the phase angle $\theta$ between the $V_1$ and $V_2$ components of the signal from amplifier 16 by comparing such signal with the reference voltage. Such measured quadrature component $V_2$ may be either a negative quadrature component (negative IP phase shift $\phi$) lagging the AC current input or a positive quadrature component (positive IP phase shift $\phi$) leading the AC current input depending on the characterization of the formation surrounding the borehole. Such measurements of the induced polarization of the formation surrounding the borehole is then recorded up-hole in the form of an IP log in correlation with the depth of the sonde within the borehole.

Figure 2:
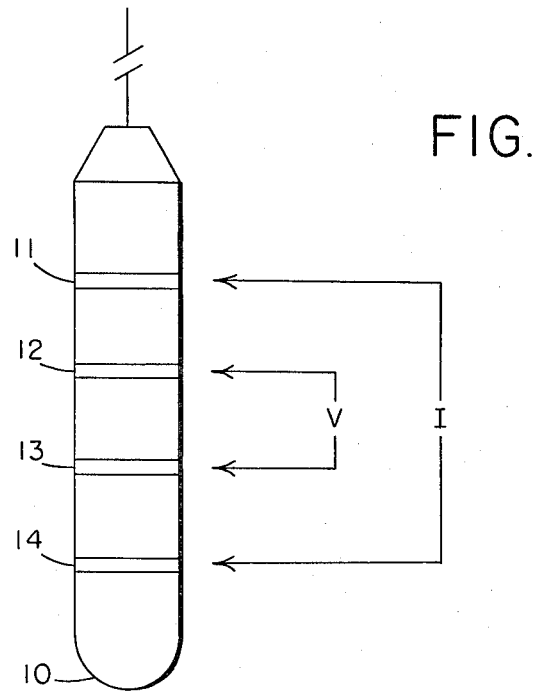

An alternate arrangement termed the Wenner Array, for the current and voltage electrodes is illustrated in FIG. 2. While the dipole-dipole array of FIG. 1 will yield the best vertical depth resolution, the Wenner Array will yield the best sensitivity.

To use such in-situ IP measurements as an indirect measure of clay mineral surface area a correlation is established between the actual surface area and the IP measurement on core samples. The actual surface area is measured directly through nuclear magnetic resonance measurements for each core sample. The IP measurement is also made for each core sample and the correlation established. This correlation can then be used for in-situ IP measurements to relate such in-situ IP measurements to the actual surface area of the particular clay mineral.

Figure 3:
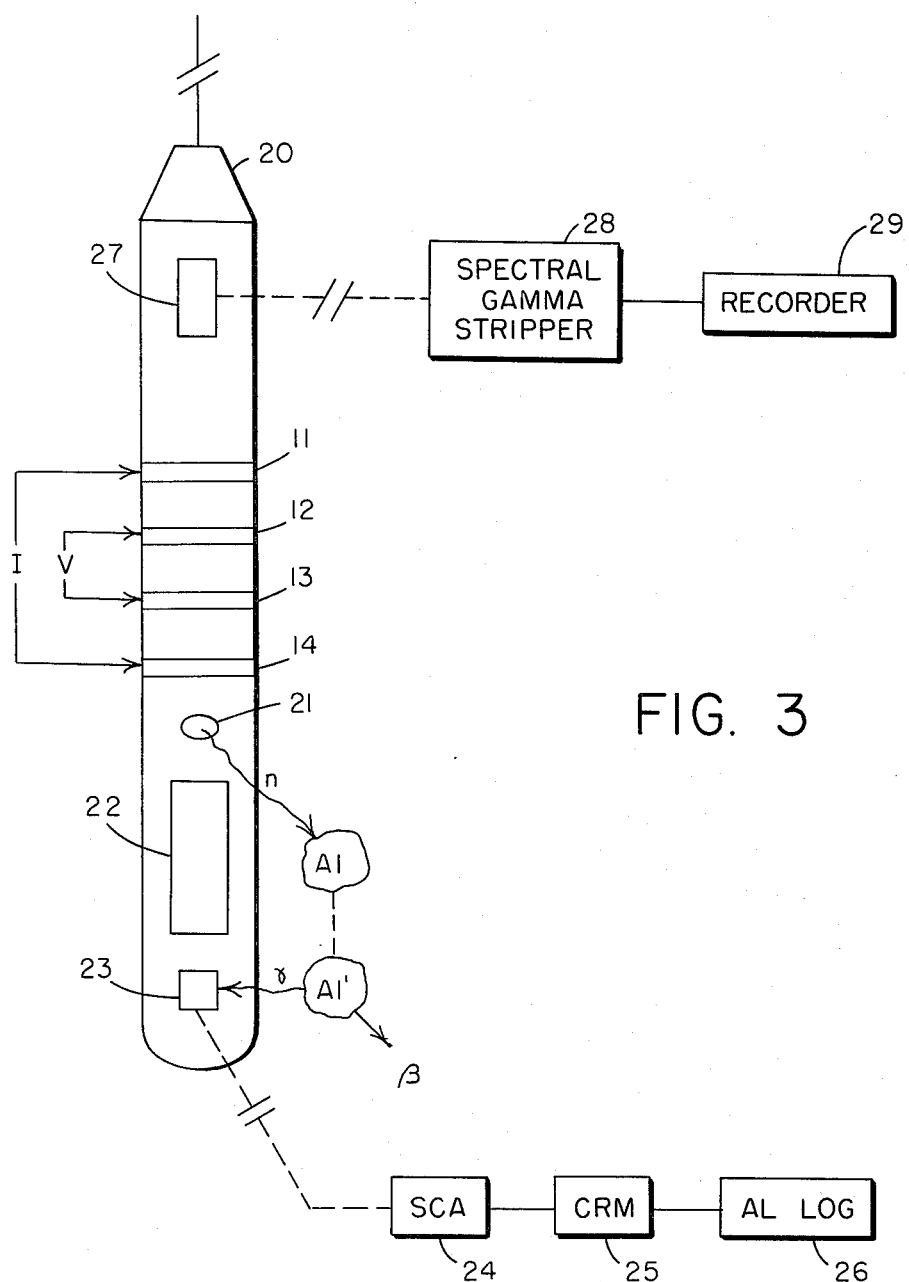
FIG. 3 illustrates a logging system for recording a nuclear log of delayed gamma-rays from the activation of aluminum in the formations surrounding a borehole, a natural gamma-ray log from potassium in the formations surrounding a borehole, and an IP log.

Referring now to FIG. 3 there is shown a preferred logging sonde for carrying out the present invention of making nuclear measurements in-situ, in addition to induced polarization measurements, for identifying characteristic elements of clays, such as aluminum and potassium. The logging sonde 20 includes a neutron source 21, preferably a Californium-252 source, a neutron shield 22, and a gamma-ray detector 23, preferably a NaI scintillation detector. The average energy of neutrons from the Californium-252 source 21 is about 2.348 MEV and is sufficiently low in energy to produce delayed gamma radiation of 1.78 MEV by thermal neutron activation of any aluminum in the formation in accordance with the following activation reaction:

$$^{27}Al(n,\gamma)^{28}Al \qquad (1)$$

$$^{28}Al\beta - {}^{28}Si + \gamma(1.78 \text{ MEV}) \qquad (2)$$

Virtually no $^{28}Al$ is produced by the fast neutron reaction:

$$^{28}Si(n,p)^{28}Al. \qquad (3)$$

The spacing between the neutron source 21 and the gamma-ray detector 23 is selected to yield maximum response by the gamma-ray detector 23 to the 1.78 MEV aluminum gamma-rays at an acceptable logging speed. A particularly suitable spacing is in the order of 5 to 6 feet.

The gamma-ray measurement from detector 23 is applied uphole to the single-channel analyzer 25 which is biased to pass to the count rate meter 25 only those amplified signals from detector 23 that are in an energy window that maximizes the count of 1.78 MEV gamma-rays. The count rate from count rate meter 25 is recorded on the recorder 26 as the measure of aluminum content with depth in the formation surrounding the borehole being logged.

The logging sonde also includes a natural gamma-ray detector 27 for use in identifying potassium present in the formations. This detector must be separated from the neutron source by about 6-8 feet so as not to measure capture gamma-rays, and must precede the source so as not to count aluminum activation gamma-rays. Naturally occurring gamma-rays measured by detector 27 are applied uphole to a spectral gamma stripper 28 of the type described in U.S. Pat. No. 3,940,610 which operates to separate the gamma-rays attributable to potassium, uranium and thorium. Those gamma-rays attributable to potassium and within an energy window centered about 1.46 MEV are recorded on the recorder 29 as a measure of the potassium content with depth in the formation surrounding the borehole being logged.

Having described the production of the IP, aluminum and potassium logs, the use of such logs in identifying low resistivity sands associated with large surface area clays from which water-free oil or gas can be produced will now be described in conjunction with the following mineral identification table.

| CLAY MINERAL IDENTIFICATION BY INDUCED POLARIZATION, ALUMINUM AND POTASSIUM | | | |
|---|---|---|---|
| CLAY | AL | K | SURFACE AREA $M^2$/GM |
| Kaolinite | 19.1 ± .15 | 0.6 ± .4 | 10–40 |
| Smectite | 10.3 ± 2.1 | 0.3 ± .17 | 550–750 |
| Illite | 12.6 ± 2.2 | 5.0 ± .14 | 30–70 |
| Chlorite | 10.7 ± 2.1 | — | 42 |
| Glauconite | 6.4 ± 2.6 | 5.8 ± 2.2 | — |
| Sepiolite | 0.5 ± .4 | — | 392 |
| Attapulgite | 4.8 ± .9 | 0.23 ± .23 | 140 |

Minerals other than clay minerals also contain aluminum and potassium and could be frequently encountered, such as potassium feldspar ($KAlSi_3O_8$) and plagioclase ($NaAlSi_3O_8$). Detector 27 also provides a measure of thorium. While thorium is associated with clays, but not necessarily quantitatively, it is to a much lesser degree associated with feldspar and plagioclase. Therefore thorium can be used as a discriminator against the non-clay minerals that contain aluminum and potassium.

It is a specific feature of the present invention to use the IP electrical log and the nuclear logs identifying characteristic elements of clays, such as aluminum and potassium, to identify large surface area clays associated with low resistivity sands, that, even though having a high water saturation, produce almost water-free oil or gas as contrasted with clean sands and small surface area clays that have a high water saturation and produce much water and little if any oil or gas. It can be seen from the foregoing table that the combination of the three logs, IP, Al and K, does uniquely identify such large surface area clays.

I claim:

1. A method for identifying select clay minerals in subsurface formations, comprising the steps of:
    (a) conducting in-situ induced polarization measurements in the subsurface formations, (b) identifying any aluminum content of the subsurface formations through a measurement of delayed gamma-rays from the neutron activation of said aluminum, (c) identifying any potassium content of the subsurface formations through a measurement of natural gamma-rays from said potassium, and (d) correlating said in-situ measurements of induced polarization, aluminum content, and potassium content with known combinations of such measurements for each of a plurality of select clay minerals to identify the presence of any of said select clay minerals in said subsurface formations.

2. A method for identifying complex lithologies in a subsurface formation surrounding a borehole, comprising the steps of:

(a) measuring the surface area of the clay mineral content of said subsurface formation through induced polarization, (b) measuring delayed gamma-rays from the activation of aluminum in said subsurface formation, (c) measuring natural gamma-rays from potassium in said subsurface formation, and (d) combining said measurements of clay mineral surface area, delayed gamma-rays from aluminum and natural gamma-rays from potassium to identify the composition of the lithology of said subsurface formation.

3. The method of claim 2 wherein said step of measuring clay mineral surface area through induced polarization comprises the steps of:

(a) introducing an electrical current into said formation through a pair of in-situ current electrodes, and (b) measuring the resulting out-of-phase voltage in said formation through a pair of in-situ voltage electrodes, said voltage is representative of the reactive component of the electrical impedance of said formation and is related to the surface area of the clay mineral content of said formation.

4. The method of claim 2 wherein said step of measuring delayed gamma-rays from the activation of aluminum comprises the steps of:

(a) irradiating said formation with neutrons of sufficient energy to produce delayed gamma-rays of about 1.78 MEV from the activation of aluminum in said formation, and (b) measuring said delayed gamma-rays within an energy window to maximize the count of 1.78 MEV gamma rays.

5. The method of claim 2 wherein said step of measuring natural gamma-rays from potassium comprises the measurement of gamma-rays within an energy window centered about 1.46 MEV.

6. A method for identifying complex lithologies in a subsurface formation surrounding a borehole, comprising the steps of:

(a) conducting nuclear magnetic resonance measurements on core samples of select clay minerals from subsurface deposits to provide a direct measure of the surface area of said select clay minerals, (b) conducting induced polarization measurements on said core samples to provide a correlation between the extent of polarization induced in each of the select clay minerals and its directly measured surface area, (c) conducting in-situ induced polarization measurements in the subsurface formations surrounding a borehole to provide an indirect measurement of the surface area of the clay mineral content in said subsurface formation, (d) identifying any aluminum content of the subsurface formation through a measurement of delayed gamma-rays from the neutron activation of said aluminum, (e) identifying any potassium content of the subsurface formation through a measurement of natural gamma-rays from said potassium, and (f) correlating said in-situ measurements of induced polarization, aluminum content and potassium content with known combinations of such measurements for each of a plurality of select clay minerals to identify the clay mineral content in the subsurface formation surrounding the borehole.

7. A method of identifying complex lithologies in a subsurface formation surrounding a borehole comprising the steps of:

(a) identifying the combination of surface area, aluminum content and potassium content in core samples of select clay minerals from subsurface deposits, (b) introducing a stimulating electrical current flow through the core samples for each of said select clay minerals and measuring the resulting phase angle between said stimulating current flow and the resulting induced voltage in the core sample, said phase angle being related to the surface area of the select clay mineral content of the core sample, (c) introducing a stimulating electrical current flow into a subsurface formation surrounding a borehole, (d) measuring the resulting in-situ phase angle between said stimulating electrical current flow in the subsurface formation and the induced voltage within the subsurface formation as an identification of surface area of the clay mineral content in said subsurface formation, (e) irradiating said subsurface formation with neutrons of sufficient energy to produce delayed gamma-rays from the activation of any aluminum in said formation, (f) measuring said delayed gamma-rays from aluminum, (g) measuring natural gamma-rays from any potassium present in said formation, and (h) correlating the combination of said identified surface area of the clay mineral content of said subsurface formation, said delayed gamma-ray measurement from aluminum in said subsurface formation and said natural gamma-ray measurement from potassium in said subsurface formation with known combinations of said measurements for said select clay minerals to identify the presence of any of said clay minerals in the complex lithology of said subsurface formation.

* * * * *